(12) United States Patent
Devenyi

(10) Patent No.: US 6,967,793 B1
(45) Date of Patent: Nov. 22, 2005

(54) LENS ASSEMBLY WITH EXTERNALLY ADJUSTABLE LENS SPACING, AND METHOD FOR ITS ASSEMBLY

(75) Inventor: Gabor Devenyi, Penetang (CA)

(73) Assignee: Raytheon Company, Waltham, MA (US)

( * ) Notice: Subject to any disclaimer, the term of this patent is extended or adjusted under 35 U.S.C. 154(b) by 108 days.

(21) Appl. No.: 10/811,001

(22) Filed: Mar. 26, 2004

(51) Int. Cl.⁷ .............................................. G02B 7/02
(52) U.S. Cl. .................. 359/819; 359/811; 359/823; 359/826; 359/829; 359/830; 359/700
(58) Field of Search ................................ 359/811, 819, 359/823, 826, 829, 830, 696, 699, 700; 396/20, 262, 326

(56) References Cited

U.S. PATENT DOCUMENTS

| | | | | |
|---|---|---|---|---|
| 4,302,076 A | * | 11/1981 | Hashimoto | 359/830 |
| 4,640,579 A | * | 2/1987 | Takizawa | 359/826 |
| 5,285,322 A | * | 2/1994 | Horning et al. | 359/826 |
| 6,288,855 B1 | * | 9/2001 | Devenyi | 359/830 |
| 6,819,510 B1 | * | 11/2004 | Devenyi | 359/826 |
| 6,825,991 B2 | * | 11/2004 | Takanashi et al. | 359/696 |
| 6,829,103 B2 | * | 12/2004 | Kobayashi et al. | 359/700 |

* cited by examiner

Primary Examiner—Loha Ben
(74) Attorney, Agent, or Firm—William C. Schubert; Karl A. Vick

(57) ABSTRACT

A lens assembly includes a housing having a housing body, a cylindrical bore in the housing body with an internal bore surface and a cylindrical housing axis, at least one access window through the housing body that permits external access to an interior of the housing body, and an interior helical recess in the bore surface. A cylindrical lens element has an external cylindrical lens element surface received within the cylindrical bore of the housing and a cylindrical lens-element axis coincident with the cylindrical housing axis. The lens element includes a lens positioned perpendicular to the cylindrical lens-element axis, an adjustment engagement that is externally accessible through the access window of the housing, and an exterior helical recess in the external cylindrical lens element surface. The exterior helical recess has the same pitch as the interior helical recess and is in facing relation to the interior helical recess. The lens assembly is assembled and adjusted by rotatably engaging the interior helical recess and the facing exterior helical recess with a thread wire; and adjusting the axial position of the lens element by rotating the lens element relative to the housing body. The approach may be used with multiple lens elements.

19 Claims, 3 Drawing Sheets

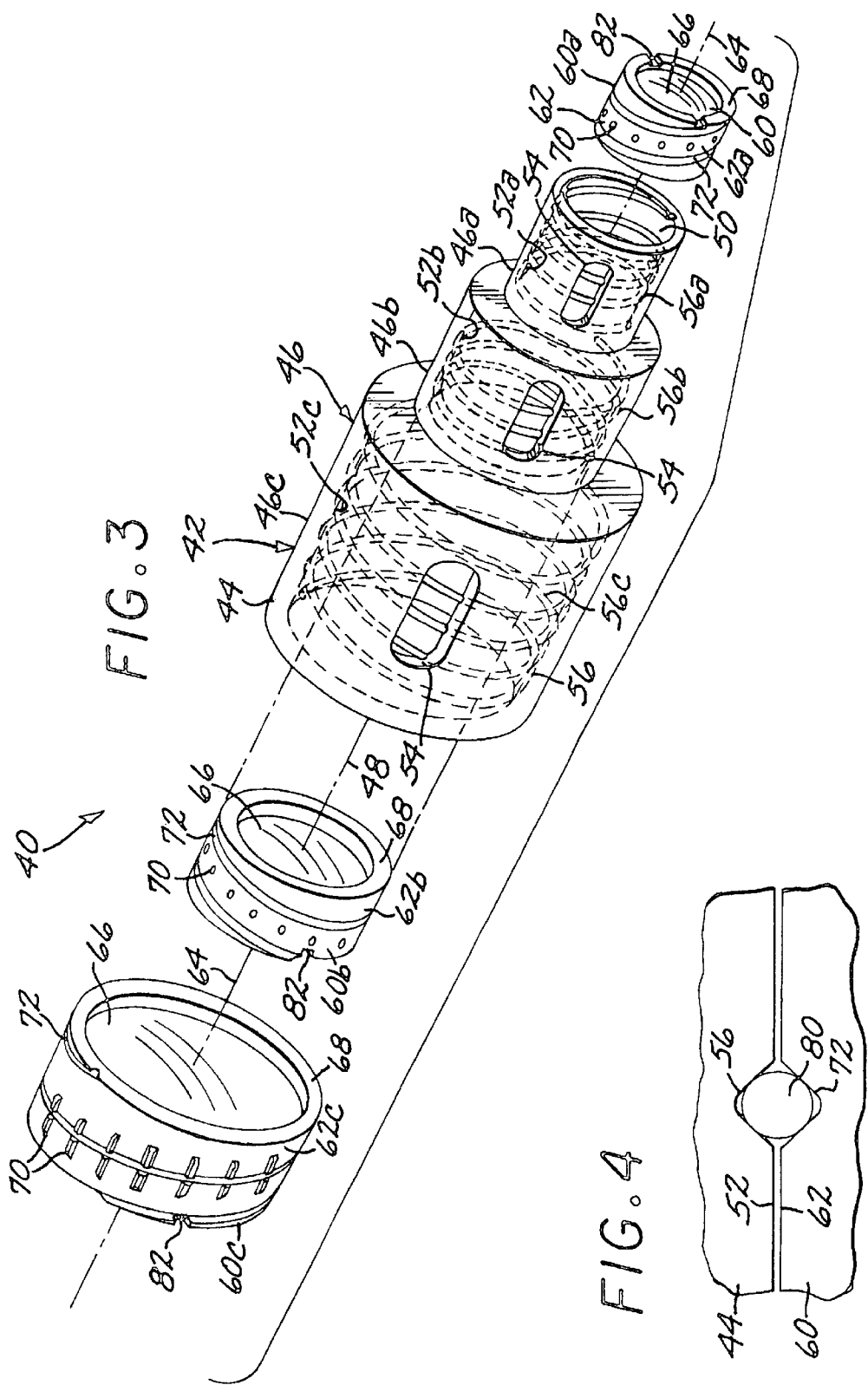

LENS ASSEMBLY WITH EXTERNALLY ADJUSTABLE LENS SPACING, AND METHOD FOR ITS ASSEMBLY

This invention relates to an optical system with a lens assembly and, more particularly, to the structure of the lens assembly and a method for its assembly and adjustment.

BACKGROUND OF THE INVENTION

Many optical systems using lens assemblies achieve acceptable optical performance with a standardized structure in which the lenses are supported on mounting surfaces in the lens housing. In this case, the housing and the lenses are manufactured to normal manufacturing tolerances, and the lenses are inserted into the housing and fixed in place without adjustment. On the other hand, high-performance optical assemblies having one or more lenses may require a level of optical performance beyond that achievable within normal manufacturing variations of the lenses and the lens housing. In this case, it may be necessary to axially adjust the positions of the lenses relative to each other during assembly in an iterative manner, until the required optical performance is achieved. The lenses are then fixed in place.

The usual approach for assembling such a high-performance optical system that requires adjustability during assembly is to assemble the lenses into the housing without fixing them in place, and then to check the optical performance. If it is determined that a lens must be moved axially to improve the optical performance, the axial movement is achieved by disassembling the assembly, and machining the mounting surface to move the lens in a first axial direction, or adding in a shim at the mounting surface to move the lens in a second axial direction opposite to the first axial direction. The lenses are reassembled in the housing, and the optical performance is rechecked. Axial re-adjustments are made as needed, and the process is repeated until the required optical performance is reached. The lenses are then permanently fixed to the housing.

This assembly and adjustment approach is often operable. However, it is slow, tedious, and uneconomic. It may also have significant technical problems. Upon each disassembly and reassembly, there may be a random error that introduces uncertainty as to whether the subsequent measurements and adjustments will be effective in producing the required optical performance. There is also a possibility of damage to the lenses or the housing at each disassembly/reassembly iteration.

There is a need for an improved approach to the assembly and optical adjustment of high-performance lens assemblies. The present invention fulfills this need, and further provides related advantages.

SUMMARY OF THE INVENTION

The present invention provides a lens assembly and a method for its assembly. This approach achieves a precise optical spacing between lenses and other optical components without repeated disassembly, rework, and reassembly. It is therefore faster and more economical, and avoids random errors in reassembly that are associated with other techniques. When the required positionings are achieved, the lenses and other optical components may be fixed permanently or semi-permanently in place.

In accordance with the invention, a method for assembling a lens assembly includes providing a housing having a housing body, a cylindrical bore in the housing body with an internal bore surface and a cylindrical housing axis, at least one access window through the housing body that permits external access to an interior of the housing body, and an interior helical recess in the bore surface. There is also provided a cylindrical lens element having an external cylindrical lens element surface received within the cylindrical bore of the housing and having a cylindrical lens-element axis coincident with the cylindrical housing axis. The lens element includes a lens positioned perpendicular to the cylindrical lens-element axis, an adjustment engagement that is externally accessible through the access window of the housing, and an exterior helical recess in the external cylindrical lens element surface. The exterior helical recess has the same pitch as the interior helical recess and is in facing relation to the interior helical recess. The method further includes rotatably engaging the interior helical recess and the facing exterior helical recess with a thread wire, and adjusting the axial position of the lens element by rotating the lens element relative to the housing body.

There is typically an assessment of the optical performance of the lens assembly at a selected axial position, and then the adjusting step are repeated as needed. Upon reaching the required optical performance, the relative position of the lens element may be fixed in place by any operable approach, such as the use of an adhesive to fix the lens element to the housing body, which thereby serves as a retainer.

In the usual case, there is at least one additional lens element in the lens assembly. Such as cylindrical second (or further) lens element has an external cylindrical second lens element surface received within the cylindrical bore of the housing. The second lens element includes a second lens. In one case, the second lens element is stationary and not movable relative to the housing, so that the (first) lens is moved relative to the second lens and the second lens is not moved at all. In another case, the second lens element includes a second lens, a second-lens-structure adjustment engagement that is externally accessible through the access window of the housing, and a second exterior helical recess in the external cylindrical second lens element surface. The second exterior helical recess has the same pitch as the interior helical recess and is in facing relation to the interior helical recess. The interior helical recess and a facing portion of the second exterior helical recess are engaged with a second thread wire. In this case, the portion of the interior helical recess to which the second lens element is engaged may be of the same cylindrical diameter and pitch as the portion of the interior helical recess to which the lens element is engaged, or of different diameters and or pitches. The thread wire and the second thread wire may be a single piece of metal, or different pieces of metal.

More generally, a method for assembling a lens assembly use a housing having a housing body, a cylindrical bore in the housing body with an internal bore surface and a cylindrical housing axis, and at least one access window through the housing body that permits external access to an interior of the housing body. The method further uses a cylindrical lens element having an external cylindrical lens element surface received within the cylindrical bore of the housing and having a cylindrical lens-element axis coincident with the cylindrical housing axis. The lens element includes a lens positioned perpendicular to the cylindrical lens-element axis, and an adjustment engagement that is externally accessible through the access window of the housing. The method includes providing an axially continuously adjustable engagement between the lens element and the housing body, wherein the axially continuously adjustable engagement is externally adjustable from an exterior of the housing, and adjusting an axial position of the lens element using the axially continuously adjustable engagement.

Other compatible features discussed herein may be used with this embodiment. For example, the axially continuously adjustable engagement may be a rotatable engagement between the lens element and the housing body. The step of adjusting includes the step of rotating the lens element relative to the housing body about the cylindrical housing axis, thereby causing the lens element to move axially along the cylindrical housing axis. The axially continuously adjustable engagement desirably includes a biasing spring that reacts between the lens element and the housing body. The relative position of the lens element and the housing body is preferably fixed after the step of adjusting.

A lens assembly is preferably structured as described above. Compatible features discussed herein may be used with the lens assembly.

The present approach produces a highly precise spacing between a lens and other optical elements, such as between two or more lenses. There is no repeated disassembly, reworking, and reassembly that can produce random errors. The adjustments in the axial position of the lens(es) are made through the access window(s) in the housing body, by turning the lens(es) on the engagement between the lens(es) and the interior helical recess of the housing body.

The thread wire serves both as the thread upon which the lens elements turn, and also as a spring bias to hold the lens elements in a play-free position and to avoid backlash upon reversal of the direction of the rotation of the lens element. With this configuration, the lens elements are held relatively securely and rigidly in place even before they are permanently or semi-permanently fixed in position at these same locations, so that optical performance measurements of the optical assembly are reliable indicators of the optical performance after the lens elements are permanently or semi-permanently fixed in place.

The present approach therefore reliably produces a more precise spacing between the lenses and other optical elements in the lens assembly. It is also significantly faster and more economical in producing the precise spacing than are conventional methods, and in reaching the final lens assembly.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a schematic partially exploded perspective view of a second embodiment of a lens assembly according to the present approach; and FIG. 4 is a detail of the assembled interior helical recess, exterior helical recess, and thread wire.

DETAILED DESCRIPTION OF THE INVENTION

Figure 1:
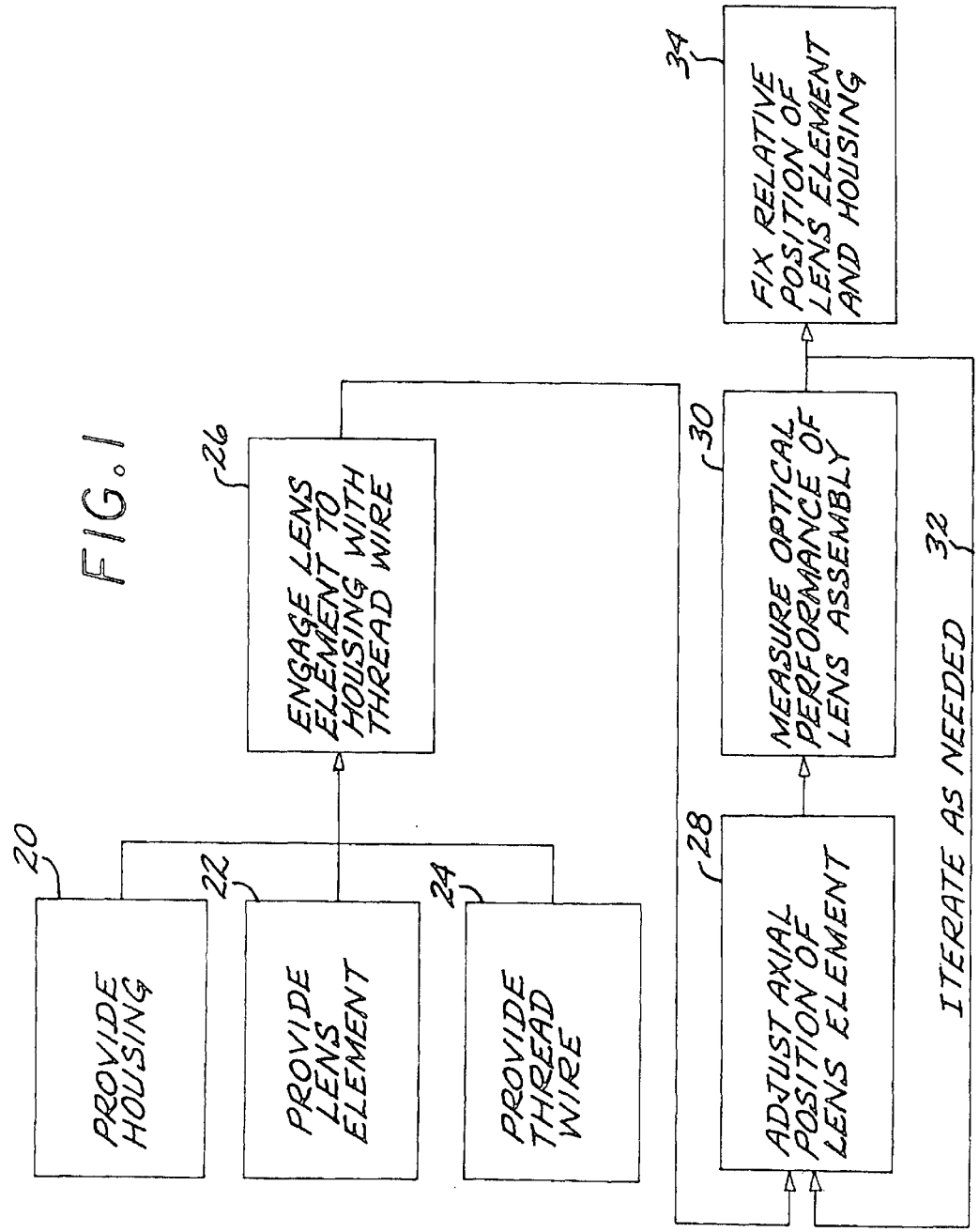
FIG. 1 is a block flow diagram of an embodiment of an approach for assembling and adjusting a lens assembly.
Figure 2:
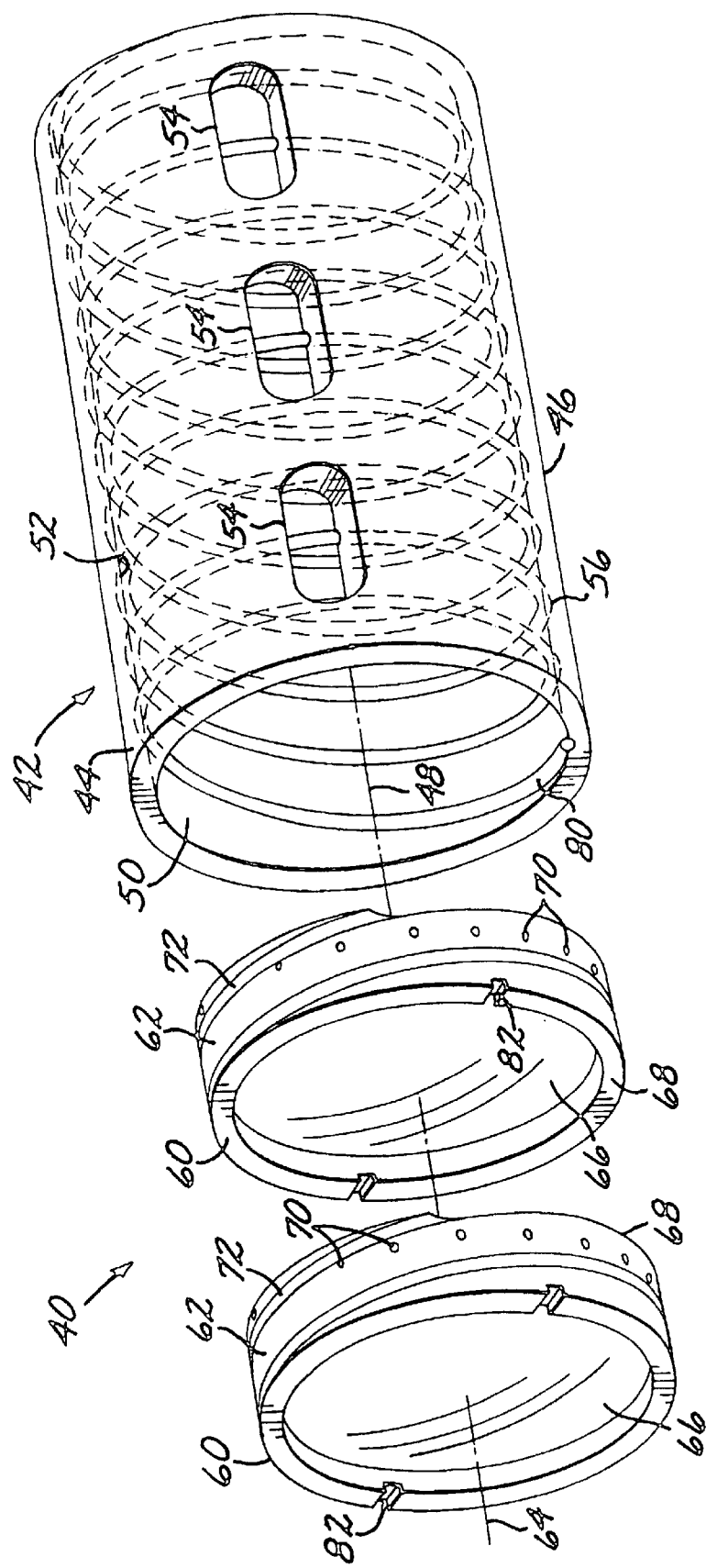
FIG. 2 is a schematic partially exploded perspective view of a first embodiment of a lens assembly according to the present approach.

FIG. 1 depicts the steps in a method for assembling a lens assembly, and FIGS. 2 and 3 illustrate two embodiments of lens assemblies 40 that may be produced by this approach.

A housing 42 is provided, step 20. The housing 42 includes a housing body 44 that typically but not necessarily has a housing external surface 46 that is substantially cylindrical about a cylindrical housing axis 48. In the embodiment of FIG. 2, the housing external surface 46 is cylindrical with a single cylindrical diameter. In the embodiment of FIG. 3, the housing external surface 46 is cylindrical with a series of different segments 46a, 46b, and 46c, each with a different cylindrical diameter relative to the cylindrical housing axis 48. The housing 42 has a cylindrical bore 50 in the housing body 44 with an internal bore surface 52. In the embodiment of FIG. 2, the internal bore surface 52 is cylindrical with a single cylindrical diameter. In the embodiment of FIG. 3, the internal bore surface 52 is cylindrical with a series of different segments 52a, 52b, and 52c, each with a different cylindrical diameter relative to the cylindrical housing axis 48.

There is at least one access window 54 through the housing body 44 that permits external access to an interior of the housing body 44 (i.e., the bore 50). The access window 54 is open during the adjustment step to be discussed subsequently, but it may later be closed, as with a plug, to prevent contamination of the bore 50 and the lenses within the housing 42.

The housing 42 further includes an interior helical recess 56 in the bore is surface 52. In the embodiment of FIG. 2, the interior helical recess 56 has a single cylindrical diameter. In the embodiment of FIG. 3, the interior helical recess 56 is cylindrical with a series of different recess segments 56a, 56b, and 56c, each with a different cylindrical diameter relative to the cylindrical housing axis 48. The interior helical recess 56 may have any cross-sectional shape, but is preferably formed generally in a notch shape with converging sides and a rounded bottom. The pitch of the interior helical recess 56, defined as the amount of advance parallel to the cylindrical housing axis 48 per full (360 degrees) of revolution may be any operable amount, but is preferably on the order of from about 0.75 to about 5 millimeters. In the embodiment of FIG. 3, the pitches of the three recess segments 56a, 56b, and 56c may be the same or different.

A cylindrical lens element 60 is provided, step 22. The cylindrical lens element 60 has an external cylindrical lens element surface 62 received within the cylindrical bore 50 of the housing 42. There may be a single cylindrical lens element 60 or, more typically, two or more cylindrical lens elements 60. In the embodiment of FIG. 2, there are two cylindrical lens elements 60, each with the same diameter of the respective external cylindrical lens element surface 62. In the embodiment of FIG. 3, there are three cylindrical lens elements 60a, 60b, and 60c, each with a different cylindrical diameter of the respective external cylindrical lens element surfaces 62a, 62b, and 62c, corresponding to the three different internal bore surfaces 52a, 52b, and 52c within which they are received in respective facing relations. Each cylindrical lens element 60 has a cylindrical lens-element axis 64 coincident with the cylindrical housing axis 48.

The lens element 60 further includes a lens 66 positioned perpendicular to the cylindrical lens-element axis 64. The lens 66 is transparent to the ultraviolet, visible, or infrared wavelength of light that is being transmitted through the lens assembly 40. Where there is more than one lens element 60, the lens 66 of each respective lens element 60 may be the same or different, but typically the lenses 66 are all different. The lens 66 may be the entire lens element 60 so that the radially facing surface of the lens 66 defines the cylindrical lens element surface 62. More preferably and as illustrated, the lens 66 may be provided with an annular band 68 on its radially facing edge, with the external surface of the annular band defining the cylindrical lens element surface 62.

Each lens element 60 has an adjustment engagement 70 that is externally accessible through one or more of the access windows 54 of the housing 42. In the preferred approach, the adjustment engagement 70 is a series of round or slot-shaped holes extending radially into the cylindrical lens element surface 62 at increments around the circumference of the cylindrical lens element surface 62, most preferably into the annular band 68 of each of the lens elements 60. These adjustment engagements 70 receive an adjustment tool (not shown) that may be inserted through the access window 54 to turn the lens element 60 about the cylindrical housing axis 48.

There is an exterior helical recess 72 in the external cylindrical lens element surface 62. The exterior helical recess 72 may have any cross-sectional shape, but is preferably formed generally in a notch shape with converging sides and a rounded bottom. The exterior helical recess 72 has the same pitch as the interior helical recess 56 of the housing 42 and (when assembled) is in facing relation to the respective portion of the interior helical recess 56.

A thread wire 80 is provided, step 24. The thread wire 80 is typically a piece of steel wire such as spring wire having a circular cross section. In cases such as in FIG. 2 where the cylindrical bore 50 has a single cylindrical diameter, there is typically a single piece of thread wire 80 that extends over the entire operating length of the helical recesses 56 and 72. In cases such as in FIG. 3 where the cylindrical bore 50 has two or more segments of different cylindrical diameters, the is typically a different length of thread wire 80 for each of the segments. The different lengths of thread wire 80 may have the same diameter or different diameters.

The interior helical recess 72 of the lens element 60 is rotatably engaged, step 26, to the facing exterior helical recess 56 of the housing 42 with the thread wire 80, as seen in FIG. 4. This engagement 26 is preferably performed by inserting the thread wire 80 into the exterior helical recess 56 in a helical manner, and then screwing the lens element 60 onto the thread wire 80 using tool slots 82 on the ends of the lens elements 80. The rotational movement of the lens element 60 on the threaded engagement moves the lens element 60 axially per turn by an amount determined by the pitch of the helical recesses 56 and 72. In this manner each of the lens elements 60 is moved to approximately its proper position relative to the other optical components such as the other lens elements 60.

The present method could be performed using conventional machined threads in the interior bore surface 52 and the exterior lens element surface 62. However, that approach is not preferred because the play in the machined threads and the backlash upon rotation reversal of such machined threads would be deleterious to the precise evaluation and measurement of the optical performance of the lens assembly 40. In the present approach, the bending of the thread wire 80 in the helical recesses 56 and 72 serves to bias the lens element 60 into a stable position that is retained so that play and backlash are negated. Additionally, the minimum pitch that may be produced in machined threads is determined by the strength of the thickness of the material that defines the threads. The thread-wire approach illustrated in FIGS. 2–4 allows a much finer pitch to be used. This finer pitch allows close control over the axial positioning of the lens 66.

The axial positions of the lens elements 60 are further adjusted, step 28, by rotating the respective lens element 60 relative to the housing body 44. In most cases, this further adjustment 28 cannot be accomplished using the slots 82 because other lens elements 60 or other structures are in the way. The adjustment step 28 is therefore accomplished by extending the adjustment tool (not shown) through one of the access windows 54 and engaging the adjustment engagement 70 with the adjustment tool. A circumferential movement of the adjustment tool causes the lens element 60 to rotate slightly about the cylindrical housing axis 48. A rotation of X degrees causes the lens element 60 and its lens 66 to move axially by an amount of X/360×TP, where TP is the thread pitch of the helical recesses 56 and 72 in distance per 360 degree turn. This adjustment 28 thereby provides a very fine axial positioning adjustment of the lens 66 parallel to the cylindrical housing axis 48. Such a fine axial adjustment is what is needed at this point, to achieve precise positioning of the lens elements 60.

After adjustment of one or more of the lens elements 60, the optical performance of the lens assembly 40 is measured, step 30, by any operable approach. The optical performance is typically measured by passing light through the optical system defined by the lenses 66, and measuring some metric defining the performance. Many optical measurement techniques are known in the art, and the precise optical performance measurement selected is not a part of the present invention.

In many cases, the optical performance may be further improved by iteratively repeating steps 28 and 30, as indicated by step 32. After an adjustment in the axial position(s) of the lens element(s) 60, step 28, the optical performance is again measured, step 30. This iterative adjustment 28 and measuring 30 are repeated as many times as necessary. In this iterative adjustment procedure 32, the lens elements 60 are not disassembled from the housing 42, and in fact are moved only short distances. The incidence of random disassembly/reassembly errors is thereby avoided.

After the lens elements 60 have been adjusted so that the measured optical performance of the lens assembly 40 is acceptable, the relative position of each lens element 60 and the housing body 44 is fixed, step 34, using a retainer. This fixing 44 may be accomplished by any operable approach. The use of a small mass of adhesive, injected from a syringe extending through the access window 54 to contact both the internal bore surface 52 and the cylindrical lens element surface 62, is preferred. The adhesive thus serves as the retainer. The adhesive need not be provided to anchor the lens element 60 around its entire periphery, but only to prevent further turning of the lens element 60 relative to the housing body 44.

The present approach has been reduced to practice using the approach of FIGS. 1, 2, and 4 and found operable as described.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for assembling a lens assembly, comprising the steps of
    providing a housing having
        a housing body,
        a cylindrical bore in the housing body with an internal bore surface and a cylindrical housing axis,
        at least one access window through the housing body that permits external access to an interior of the housing body, and an interior helical recess in the bore surface;

providing a cylindrical lens element having an external cylindrical lens element surface received within the cylindrical bore of the housing and having a cylindrical lens-element axis coincident with the cylindrical housing axis, wherein the lens element includes
- a lens positioned perpendicular to the cylindrical lens-element axis,
- an adjustment engagement that is externally accessible through the access window of the housing, and
- an exterior helical recess in the external cylindrical lens element surface, wherein the exterior helical recess has the same pitch as the interior helical recess and is in facing relation to the interior helical recess;

rotatably engaging the interior helical recess and the facing exterior helical recess with a thread wire; and adjusting the axial position of the lens element by rotating the lens element relative to the housing body.

2. The method of claim 1, including an additional step, after the step of adjusting, of
fixing the relative position of the lens element and the housing body.

3. The method of claim 2, wherein the step of fixing includes the step of
fixing the relative position with a mass of an adhesive.

4. The method of claim 1, wherein the method further includes
providing a cylindrical second lens element having an external cylindrical second lens element surface received within the cylindrical bore of the housing, wherein the second lens element includes a second lens.

5. The method of claim 1, wherein the method further includes
providing a cylindrical second lens element having an external cylindrical second lens element surface received within the cylindrical bore of the housing, wherein the second lens element includes a second lens and wherein the second lens element is not movable relative to the housing.

6. The method of claim 1, wherein the method further includes
providing a cylindrical second lens element having an external cylindrical second lens element surface received within the cylindrical bore of the housing, wherein the second lens element includes
- a second lens,
- a second-lens-structure adjustment engagement that is externally accessible through the access window of the housing, and
- a second exterior helical recess in the external cylindrical second lens element surface, wherein the second exterior helical recess has the same pitch as the interior helical recess and is in facing relation to the interior helical recess, and rotatably engaging the interior helical recess and a facing portion of the second exterior helical recess with a second thread wire.

7. The method of claim 6, wherein the step of rotatably engaging the interior helical recess and the facing portion of the second exterior helical recess includes the step of
providing the thread wire and the second thread wire as different portions of a length of a single piece of metal.

8. A method for assembling a lens assembly, comprising the steps of
providing a housing having
- a housing body,
- a cylindrical bore in the housing body with an internal bore surface and a cylindrical housing axis, and
- at least one access window through the housing body that permits external access to an interior of the housing body;

providing a cylindrical lens element having an external cylindrical lens element surface received within the cylindrical bore of the housing and having a cylindrical lens-element axis coincident with the cylindrical housing axis, wherein the lens element includes
- a lens positioned perpendicular to the cylindrical lens-element axis, and
- an adjustment engagement that is externally accessible through the access window of the housing;

providing an axially continuously adjustable engagement between the lens element and the housing body, wherein the axially continuously adjustable engagement is externally adjustable from an exterior of the housing; and adjusting an axial position of the lens element using the axially continuously adjustable engagement.

9. The method of claim 8, wherein the axially continuously adjustable engagement is a rotatable engagement between the lens element and the housing body, and the step of adjusting includes the step of
rotating the lens element relative to the housing body about the cylindrical housing axis, thereby causing the lens element to move axially along the cylindrical housing axis.

10. The method of claim 9, wherein the axially continuously adjustable engagement includes a biasing spring that reacts between the lens element and the housing body.

11. The method of claim 9, including an additional step, after the step of adjusting, of
fixing the relative position of the lens element and the housing body.

12. A lens assembly comprising
a housing having
- a housing body,
- a cylindrical bore in the housing body with an internal bore surface and a cylindrical housing axis,
- at least one access window through the housing body that permits external access to an interior of the housing body, and
- an interior helical recess in the bore surface;

a cylindrical lens element having an external cylindrical lens element surface received within the cylindrical bore of the housing and having a cylindrical lens-element axis coincident with the cylindrical housing axis, wherein the lens element includes
- a lens positioned perpendicular to the cylindrical lens-element axis,
- an adjustment engagement that is externally accessible through the access window of the housing, and
- an exterior helical recess in the external cylindrical lens element surface, wherein the exterior helical recess has the same pitch as the interior helical recess and is in facing relation to the interior helical recess; and a thread wire received within and engaging the interior helical recess and a facing portion of the exterior helical recess.

13. The lens assembly of claim 12, wherein the lens element is helically rotatable relative to the housing.

14. The lens assembly of claim 12, further including
a retainer joining the lens element to the housing to prevent relative rotation of the lens element relative to the housing.

15. The lens assembly of claim 12, further including
a retainer joining the lens element to the housing to prevent relative rotation of the lens element relative to the housing, wherein the retainer is a mass of an adhesive.

16. The lens assembly of claim 12, further including
a cylindrical second lens element having an external cylindrical second lens element surface received within the cylindrical bore of the housing, wherein the second lens element includes a second lens.

17. The lens assembly of claim 12, further including
a cylindrical second lens element having an external cylindrical second lens element surface received within the cylindrical bore of the housing, wherein the second lens element includes a second lens and wherein the second lens element is not movable relative to the housing.

18. The lens assembly of claim 12, further including
a cylindrical second lens element having an external cylindrical second lens element surface received within the cylindrical bore of the housing, wherein the second lens element includes
a second lens,
a second-lens-structure adjustment engagement that is externally accessible through the access window of the housing, and
a second exterior helical recess in the external cylindrical second lens element surface, wherein the second exterior helical recess has the same pitch as the interior helical recess and is in facing relation to the interior helical recess, and
a second thread wire received within and engaging the interior helical recess and a facing portion of the second exterior helical recess.

19. The lens assembly of claim 18, wherein the thread wire and the second thread wire comprise different portions of a length of a single piece of metal.

\* \* \* \* \*